United States Patent
Watanabe et al.

(10) Patent No.: US 10,717,677 B2
(45) Date of Patent: Jul. 21, 2020

(54) METHOD FOR PRODUCING TRANSPARENT ALUMINA SINTERED BODY

(71) Applicant: NGK INSULATORS, LTD., Nagoya (JP)

(72) Inventors: Morimichi Watanabe, Nagoya (JP); Kiyoshi Matsushima, Nagoya (JP); Kei Sato, Tokai (JP); Tsutomu Nanataki, Toyoake (JP)

(73) Assignee: NGK Insultators, Ltd., Nagoya (JP)

( * ) Notice: Subject to any disclaimer, the term of this patent is extended or adjusted under 35 U.S.C. 154(b) by 282 days.

(21) Appl. No.: 15/903,146

(22) Filed: Feb. 23, 2018

(65) Prior Publication Data

US 2018/0244579 A1 Aug. 30, 2018

Related U.S. Application Data

(63) Continuation of application No. PCT/JP2016/078789, filed on Sep. 29, 2016.

(30) Foreign Application Priority Data

Sep. 30, 2015 (JP) ................................. 2015-193944

(51) Int. Cl.
   *C04B 35/115* (2006.01)
   *C04B 35/645* (2006.01)
   (Continued)

(52) U.S. Cl.
   CPC ............ *C04B 35/115* (2013.01); *B32B 18/00* (2013.01); *C04B 35/6262* (2013.01);
   (Continued)

(58) Field of Classification Search
   CPC .................. C04B 35/115; C04B 2235/5292
   See application file for complete search history.

(56) References Cited

U.S. PATENT DOCUMENTS

| 6,306,788 | B1 | 10/2001 | Watanabe et al. |
| 8,178,455 | B2 | 5/2012 | Teratani et al. |
| 2002/0155944 | A1 | 10/2002 | Kurashina et al. |

FOREIGN PATENT DOCUMENTS

| JP | S51-030209 A1 | 3/1976 |
| JP | 2000-219570 A1 | 8/2000 |

(Continued)

OTHER PUBLICATIONS

English translation of International Preliminary Report on Patentability (Chapter I) (Application No. PCT/JP2016/078789) dated Apr. 12, 2018, 6 pages.

(Continued)

*Primary Examiner* — Erin Snelting
(74) *Attorney, Agent, or Firm* — Burr & Brown, PLLC

(57) ABSTRACT

A method for producing a transparent alumina sintered body according to the present invention includes (a) a step of preparing an alumina raw material powder containing a plate-like alumina powder having an aspect ratio of 3 or more and a fine alumina powder having an average particle diameter smaller than that of the plate-like alumina powder so that, when a mixing ratio of the plate-like alumina powder to the fine alumina powder in terms of mass ratio is assumed to be T:(100–T), T is 0.001 or more and less than 1, and so that a mass ratio R1 of F relative to Al in the alumina raw material powder is less than 15 ppm; (b) a step of forming a raw material for forming containing the alumina raw material powder into a compact; and (c) a step of sintering the compact so as to obtain a transparent alumina sintered body.

6 Claims, 3 Drawing Sheets

Plate-like alumina particle

Fine alumina particle

Alumina sintered body

(51) Int. Cl.
  *C04B 35/626* (2006.01)
  *G02B 1/02* (2006.01)
  *B32B 18/00* (2006.01)

(52) U.S. Cl.
  CPC ........ *C04B 35/645* (2013.01); *C04B 35/6455* (2013.01); *G02B 1/02* (2013.01); *C04B 2235/322* (2013.01); *C04B 2235/3206* (2013.01); *C04B 2235/3217* (2013.01); *C04B 2235/40* (2013.01); *C04B 2235/445* (2013.01); *C04B 2235/5292* (2013.01); *C04B 2235/5296* (2013.01); *C04B 2235/5436* (2013.01); *C04B 2235/5445* (2013.01); *C04B 2235/5472* (2013.01); *C04B 2235/604* (2013.01); *C04B 2235/6025* (2013.01); *C04B 2235/656* (2013.01); *C04B 2235/6581* (2013.01); *C04B 2235/72* (2013.01); *C04B 2235/727* (2013.01); *C04B 2235/76* (2013.01); *C04B 2235/77* (2013.01); *C04B 2235/787* (2013.01); *C04B 2235/96* (2013.01); *C04B 2235/9623* (2013.01); *C04B 2237/343* (2013.01); *C04B 2237/704* (2013.01)

(56) References Cited

FOREIGN PATENT DOCUMENTS

| JP | 2002-293609 | A1 |   | 10/2002 |
| JP | 2004359495  | A  | * | 12/2004 |
| JP | 4357584     | B2 |   | 11/2009 |
| JP | 5396176     | B2 |   | 1/2014  |
| JP | 5501040     | B2 |   | 5/2014  |

OTHER PUBLICATIONS

Hailan Yi et al, "Crystal Plane Evolution of Grain Oriented Alumina Ceramics with High Transparency," *Ceramics International*, 38 (2012), pp. 5557-5561.

Yunfei Chang et al., "Fabrication of Highly Textured Fine-Grained α-Alumina by Templated Grain Growth of Nanoscale Precursors," *Journal of the American Ceramic Society*, vol. 96, No. 5 (2013), pp. 1390-1397.

Norimasa Nishiyama, et al., "Transparent Nanocrystalline Bulk Alumina Obtained at 7.7 GPa and 800° C.," *Scripta Materialia*, vol. 69 (2013), pp. 362-365.

International Search Report and Written Opinion (Application No. PCT/JP2016/078789) dated Nov. 15, 2016.

* cited by examiner

METHOD FOR PRODUCING TRANSPARENT ALUMINA SINTERED BODY

BACKGROUND OF THE INVENTION

1. Field of the Invention

The present invention relates to a method for producing a transparent alumina sintered body.

2. Description of the Related Art

High-density, high-purity polycrystalline alumina is known to have optical translucency and can be used in light-emitting tubes for high-pressure sodium lamps, highly heat resistant window materials, parts for semiconductor devices, substrates for optical members, etc. However, owing to its crystal structure, alumina has optical anisotropy, and if the crystal orientations of the alumina grains in the sintered body are random, light is scattered and the transmittance is lowered due to the differences in refractive index among crystal grains. Thus, crystal grains in transparent alumina having a high in-line transmittance are preferably uniaxially oriented. For example, NPL 1 discloses a method for producing transparent alumina. Specifically, high-purity, high-orientation, high-density transparent alumina is produced by utilizing a high magnetic field.

Furthermore, NPL 2 discloses a method for producing uniaxially oriented alumina. Specifically, a production technique called a templated grain growth (TGG) method is used, in which a mixed alumina powder prepared by mixing a plate-like alumina powder and a fine alumina powder is used as an alumina raw material powder, and, while the plate-like alumina powder serves as seed crystals (templates) and the fine alumina powder serves as a matrix during sintering, the templates undergo homoepitaxial growth by taking in the matrix.

Furthermore, in order to enhance the transparency of the alumina sintered body, it is necessary to enhance sinterability and decrease porosity, which is one of the light-scattering factors. A known example of the technique for enhancing the sinterability and decreasing pores is a method involving adding a fluoride to an alumina raw material powder and sintering the resulting mixture. For example, in PTL 1 and PTL 2, an alumina powder and a fluoride powder are mixed, formed, and then sintered at a low temperature of 1300° C. or lower so as to obtain a dense alumina sintered body. In PTL 3, a fluorine compound is added to an alumina raw material powder, and the resulting mixture is pulverized and mixed to an average particle diameter of 2 μm or less, formed, and then sintered in air at 1600 to 1800° C. so as to obtain an alumina sintered body having excellent corrosion resistance, impact resistance, and durability.

CITATION LIST

Patent Literature

PTL 1: Japanese Patent No. 5396176
PTL 2: Japanese Patent No. 5501040
PTL 3: Japanese Patent No. 4357584

Non Patent Literature

NPL 1: Ceramics International 38 (2012) 5557-5561
NPL 2: Journal of the American Ceramic Society 96 [5] (2013) 1390-1397

SUMMARY OF THE INVENTION

However, although transparent alumina is obtained by the production method described in NPL 1, the method uses a high magnetic field; thus, the production cost is high, increasing the size is difficult, and the method is not suitable for mass production. The alumina obtained by the production method described in NPL 2 has pores, and grain boundary phases exist therein; thus, the transparency is presumed to be low.

According to the methods described in PTL 1 and PTL 2, orientation of the alumina grains is not taken into account and thus the alumina grains are aligned at random. Thus, the transparency of the obtained alumina sintered body is presumed to be low. According to the production method described in PTL 3, an alumina sintered body in which crystals are scarcely oriented and alumina grains are distributed at random is obtained. Thus, the transparency of this alumina sintered body is presumed to be low. Moreover, there is a possibility that the furnace body would be contaminated with fluorine compounds that volatilize during sintering, exhaust gas treatment becomes necessary, and thus there is a disadvantage in that the production cost is high. As such, a method for producing a transparent alumina sintered body at lower cost and easily is not known heretofore.

The present invention has been made to address such challenges and a main object is to produce a transparent alumina sintered body at lower cost and easily.

A method for producing a transparent alumina sintered body according to the present invention includes:
(a) a step of preparing an alumina raw material powder containing a plate-like alumina powder having an aspect ratio of 3 or more and a fine alumina powder having an average particle diameter smaller than that of the plate-like alumina powder so that, when a mixing ratio of the plate-like alumina powder to the fine alumina powder in terms of mass ratio is assumed to be T:(100−T), T is 0.001 or more and less than 1, and so that a mass ratio R1 of F relative to Al in the alumina raw material powder is less than 15 ppm;
(b) a step of forming a raw material for forming containing the alumina raw material powder into a compact; and
(c) a step of sintering the compact so as to obtain a transparent alumina sintered body.

The mass ratio R1 is a value calculated from formula (1) below:

$$R1=100\times[x1\times T+x2\times(100-T)+x3\times Z]/[y1\times T+y2\times(100-T)+y3\times Z] \quad (1)$$

where the unit is mass ppm. When an additive is externally added to the alumina raw material powder, a ratio of the additive relative to the alumina raw material powder is Z (mass %). In such a case, Z parts by mass of the additive is to be added to 100 parts by mass of the alumina raw material powder. x1 is an F content (mass ppm) in the plate-like alumina powder, x2 is an F content (mass ppm) in the fine alumina powder, and x3 is an F content (mass ppm) in the additive. The F contents are determined by alkali fusion-ion chromatography. y1 is an Al content (mass %) in the plate-like alumina powder, and y2 is an Al content (mass %) in the fine alumina powder. The Al contents are values (mass %) each obtained by determining an alumina purity of each alumina powder as 100—(sum in terms of mass % of impurity elements other than Al and O), and multiplying the obtained result by 0.529. The mass % of the impurity elements is determined as follows: that is, firing (high-frequency heating)-infrared absorption spectroscopy is used to determine an S content, an inert gas fusion-thermal conductivity method is used to determine an N content, inert gas fusion-nondispersive infrared absorption spectroscopy is used to determine an H content, alkali fusion-ion chromatography is used to determine an F content, and inductively coupled plasma (ICP) emission spectroscopy is used to determine contents of other elements; and y3 is an Al content (mass %) in the additive and is determined by inductively coupled plasma (ICP) emission spectrometry.

According to the method for producing a transparent alumina sintered body of the present invention, the obtained alumina sintered body has a high degree of orientation, is dense, and has a high purity and high transparency. In addition, according to this production method, there is no need to utilize a high magnetic field as in the related art, and no device for treating fluorine compounds is necessary; thus, the production cost for the transparent alumina sintered body can be suppressed low. Furthermore, since the transparent alumina sintered body can be easily produced, the method is suitable for mass production.

BRIEF DESCRIPTION OF THE DRAWINGS

FIG. 1A is a plan view, and FIG. 1B is a front view.

DETAILED DESCRIPTION OF THE INVENTION

A method for producing a transparent alumina sintered body according to the present invention includes:
(a) a step of preparing an alumina raw material powder containing a plate-like alumina powder having an aspect ratio of 3 or more and a fine alumina powder having an average particle diameter smaller than that of the plate-like alumina powder so that, when a mixing ratio of the plate-like alumina powder to the fine alumina powder in terms of mass ratio is assumed to be T:(100−T), T is 0.001 or more and less than 1, and so that a mass ratio R1 of F relative to Al in the alumina raw material powder is less than 15 ppm;
(b) a step of forming a raw material for forming containing the alumina raw material powder into a compact; and
(c) a step of sintering the compact so as to obtain a transparent alumina sintered body.

The alumina raw material powder used in step (a) is a powder prepared so that the mass ratio R1 of F relative to Al in the alumina raw material powder is less than 15 ppm. F is known to serve as a sintering aid that promotes sintering of an alumina powder; however, fluorine compounds that have volatilized during sintering can contaminate the sintering furnace and necessitate treatment of exhaust gas. Thus, from the viewpoints of yield and production cost of the sintered body, R1 is preferably less than 15 ppm. The lower limit of the mass ratio R1 is not particularly limited and may be substantially zero (for example, equal to or lower than the detection limit). The mass ratio R1 can be determined by formula (1) described above.

The alumina raw material powder is preferably prepared so that the contents of the impurity elements other than F, Mg, C, and S are each 30 mass ppm or less. When impurity elements remain after sintering, they serve as light scattering factors or coloring factors and degrade the transparency; thus, high-purity raw material powder is preferably used. The impurity concentration remaining the sintered body can be decreased by volatilizing the impurity element during sintering, and can be further decreased by decreasing the impurity concentration in the raw material powder. Thus, the contents of the impurity elements other than F, Mg, C, and S are preferably each 20 mass ppm or less, more preferably 10 mass ppm or less, and yet more preferably 1 mass ppm or less from the viewpoint of transparency. No lower limit is set.

Figure 1A:
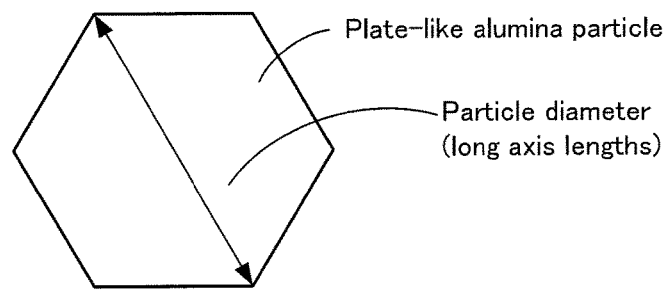
FIGS. 1A and 1B include schematic diagrams of a plate-like alumina particle.
Figure 1B:
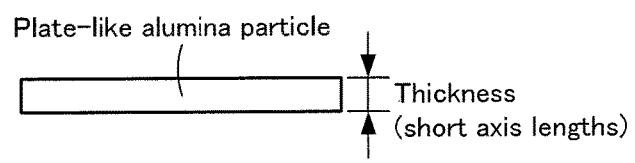

In step (a), a plate-like alumina powder is used. The plate-like alumina powder has an aspect ratio of 3 or more. The aspect is average particle diameter/average thickness. Here, the average particle diameter is the average of the long axis lengths of the particle plate surfaces, and the average thickness is the average of the short axis lengths of the particles. These values are determined by observing arbitrarily selected one hundred particles in the plate-like alumina powder with a scanning electron microscope (SEM). FIG. 1 includes schematic diagrams of a plate-like alumina particle, (a) is a plan view, and (b) is a front view. The plate-like alumina particle has a substantially hexagonal shape when viewed in plan, the particle diameter thereof is as illustrated in FIG. 1($a$), and the thickness thereof is as illustrated in FIG. 1($b$). By using the alumina raw material powder containing a plate-like alumina powder having an aspect ratio of 3 or more, the degree of orientation of the final product, alumina sintered body is increased. The average particle diameter of the plate-like alumina powder is preferably large from the viewpoint of increasing the degree of orientation, and is preferably 1.5 μm or more, more preferably 5 μm or more, yet more preferably 10 μm or more, and particularly preferably 15 μm or more. However, from the viewpoint of densification, the average particle diameter is preferably small and is preferably 30 μm or less. In view of the above, in order to achieve both a high degree of orientation and densification, the average particle diameter is preferably 1.5 μm to 20 μm.

Figure 2:
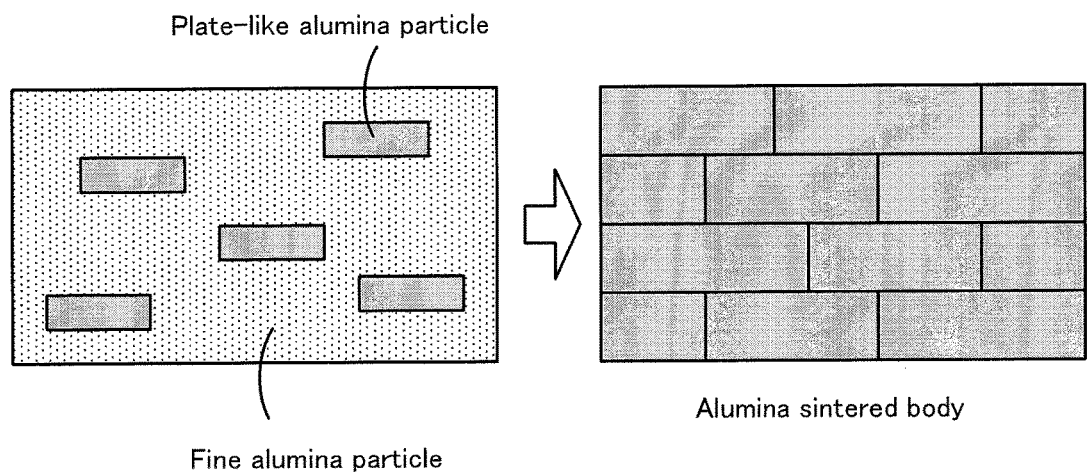
FIG. 2 is a schematic diagram of a step of preparing an alumina sintered body by a TGG method.

In step (a), a mixed alumina powder prepared by mixing a plate-like alumina powder having an aspect ratio of 3 or more and a fine alumina powder having an average particle diameter smaller than that of the plate-like alumina powder is used as the alumina raw material powder. When this raw material powder is used, the plate-like alumina powder serves as seed crystals (templates) and the fine alumina powder serves as a matrix during sintering so that the templates undergo homoepitaxial growth while taking in the matrix. This production method is called a TGG method. FIG. 2 is a schematic diagram of a step of preparing an alumina sintered body by a TGG method. According to the TGG method, the microstructure of the alumina sintered body to be obtained can be controlled by the particle diameters and the mixing ratio of the plate-like alumina powder and the fine alumina powder, and, compared to when a plate-like alumina powder alone is sintered, densification is smooth and the degree of orientation is easily improved.

In step (a), the mixing ratio of the plate-like alumina powder to the fine alumina powder in terms of mass ratio is preferably T:(100−T) (T is 0.001 or more and less than 1). This is because when T is less than 0.001, the degree of orientation of the alumina sintered body is not easily increased, and when T is 1 or more, it becomes difficult to sinter alumina. From the viewpoint of increasing the degree of orientation, T is preferably large, and is preferably 0.001 or more, preferably 0.01 or more, preferably 0.03 or more, preferably 0.05 or more, and preferably 0.1 or more. From the viewpoint of densification, T is preferably small, and is preferably less than 1, more preferably 0.9 or less, yet more preferably 0.7 or less, particularly preferably 0.35 or less, more preferably 0.1 or less, yet more preferably 0.05 or less, still more preferably 0.03 or less, and particularly more preferably 0.001 or less. The densification and increasing the degree of orientation can be smoothly achieved by using a higher sintering temperature.

Figure 3:
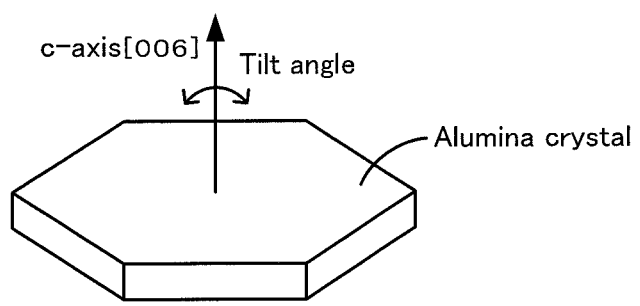
FIG. 3 is a diagram illustrating a tilt angle.

The inventors of the present invention have found that transparency is improved by decreasing the slope (tilt angle) of the orientation axis (for example, the c-axis) of the alumina sintered body and the crystal axis of each alumina grain. FIG. 3 is a schematic diagram illustrating the tilt angle. The tilt angle can be evaluated by a half width (XRC·FWHM) of an X-ray rocking curve obtained by measuring a surface of a transparent alumina substrate by an X-ray rocking curve method (omega scanning). From the viewpoint of transparency, the tilt angle is preferably small, and the XRC·FWHM is preferably 15° or less, more preferably 10° or less, more preferably 6° or less, yet more preferably 5° or less, further more preferably 4° or less, particularly preferably 3.2° or less, yet more preferably 2.6° or less, and more preferably 1° or less.

In order to decrease the XRC·FWHM, T is preferably less than 1 and more preferably 0.7 or less. The XRC·FWHM can be decreased by using a higher sintering temperature. However, as previously mentioned, an excessively small T decreases the degree of orientation (the proportion of oriented grains), increases the tilt angle, and can thereby degrade transparency. Thus, in order to achieve both the tilt angle and the degree of orientation, T is preferably 0.01 or more and less than 1, more preferably 0.03 to 0.9, yet more preferably 0.05 to 0.7, and particularly preferably 0.1 to 0.7. In order to enhance transparency, in addition to the tilt angle and the degree of orientation, the degree of densification must be increased, and the lower limit of T is preferably 0.01 or more, more preferably 0.03 or more, and yet more preferably 0.05 or more. The upper limit of T is preferably less than 1, more preferably 0.7 or less, yet more preferably 0.5 or less, and still more preferably 0.1 or less.

The higher the purity of the plate-like alumina powder, the more preferable; however, the purity is not particularly limited as long as it is in the range in which the mass ratio R1 of F relative to Al in the alumina raw material powder can be adjusted to less than 15 ppm and the contents of the impurity elements other than Mg, C, and S can each be adjusted to at least 30 mass ppm or less.

The plate-like alumina powder may be a commercially available plate-like alumina powder, but, for example, can be produced by the following procedure. That is, first, at least one transition alumina powder selected from the group consisting of gibbsite, boehmite, and γ-alumina is mixed with an $AlF_3$ powder so that the $AlF_3$ content is 0.25 mass % or more so as to prepare a mixed powder in which the total of the mass ratios of the impurity elements other than F, H, C, and S is 1000 ppm or less. Preferably, α-alumina particles are added to the mixed powder to serve as seed crystals. Next, a container is prepared such that the value obtained by dividing the mass of $AlF_3$ in the mixed powder by the volume of the container (=mass of $AlF_3$/volume of container) is $1 \times 10^{-4}$ g/cm$^3$ or more. The container preferably has a total of 1 mass % or less of the elements other than Al, O, Mg, N, and Re (Re: rare earth elements). The material for the container is preferably $Al_2O_3$ having a purity of 99.5 mass % or more. Then, the mixed powder is placed in the container and the container is covered with a lid; or the mixed powder is placed in the container and the container is hermetically sealed; or the mixed powder is enclosed in the container composed of a porous material. Then the mixed powder is heat-treated at 750 to 1650° C. to obtain a plate-like alumina powder composed of plate-like α-alumina particles. The plate-like alumina powder obtained as such can be used as the plate-like alumina powder. This plate-like alumina powder further subjected to an annealing treatment in an air, inert, or vacuum atmosphere at 600 to 1350° C. and preferably 900 to 1350° C. can be used as the plate-like alumina powder. The plate-like alumina powder may be pulverized before use.

In step (b), a raw material for forming containing the alumina raw material powder is prepared. The raw material for forming may be the alumina raw material powder itself or may be a mixture of the alumina raw material powder and a sintering aid, graphite, a binder, a plasticizer, a dispersing agent, a dispersing medium, etc. The sintering aid is preferably MgO or $La_2O_3$ and particularly preferably MgO. This is because MgO promotes densification while suppressing excess grain growth. Especially when the amount of the plate-like alumina powder added is small, the grain growth tends to be excessive, and, thus, adding MgO has high significance. When an MgO powder is to be added to the alumina raw material powder, 0.005 to 0.5 parts by mass of the MgO powder is preferably added to 100 parts by mass of the alumina raw material powder. MgO may be added in the form of a magnesium compound, such as a carbonate, a sulfate, a nitrate, or a hydroxide, that turns to MgO during the process of sintering or the like. This magnesium compound may be a powder or a liquid as long as the amount added on an MgO basis is 0.005 to 0.5 parts by mass.

In step (b), the alumina raw material powder is formed into a compact. The forming method is not particularly limited, and examples thereof include tape casting, extrusion forming, cast forming, injection molding, and uniaxial press forming.

In step (c), the compact is preferably sintered so that the contents of the impurity elements other than Mg and C contained in the transparent alumina sintered body are each 10 mass ppm or less. For example, sintering may be performed under vacuum, or in order to volatilize the impurities, preliminary sintering may be performed prior to sintering. Moreover, sintering may be performed at a temperature at which the impurities contained therein volatilize.

In step (c), the compact is preferably sintered at 1850° C. or higher. The sintering temperature (highest attained temperature) is preferably 1850 to 2050° C. and more preferably 1900 to 2000° C.

In step (c), the compact is preferably subjected to pressure-sintering. Examples of the pressure-sintering include hot press sintering, HIP sintering, and spark plasma sintering (SPS). Prior to pressure-sintering, pressureless pre-sintering may be performed. In performing HIP sintering, a capsule method may be employed. The pressure in the case where hot press sintering is employed is preferably 50 kgf/cm$^2$ or more and more preferably 200 kgf/cm$^2$ or more. The pressure in the case where HIP sintering is employed is preferably 1000 kgf/cm$^2$ or more and more preferably 2000 kgf/cm$^2$ or more. The sintering atmosphere is not particularly limited but is preferably one of an air atmosphere, a nitrogen atmosphere, an inert gas, such as Ar, atmosphere, and a vacuum atmosphere, is particularly preferably a nitrogen atmosphere or an Ar atmosphere, and most preferably a nitrogen atmosphere. The reason why the nitrogen atmosphere is preferable is not clear, but high transparency is obtained.

In step (c), when the temperature is being decreased from the highest attained temperature during sintering, a pressing pressure of 50 kgf/cm$^2$ or more is preferably applied until a particular temperature (a temperature set within the range of 1000 to 1400° C. (preferably 1100 to 1300° C.)) is reached. This can enhance the transparency of the resulting sintered body. Some degree of transparency can be obtained by performing depressurizing immediately after retaining the highest attained temperature; however, the transparency can be increased by continuously applying the pressing pressure until the temperature is decreased to the particular temperature. The reason behind this is not clear, but, presumably, depressurizing at the highest attained temperature generates pores in the sintered body and inhibits transparency. Moreover, in the temperature range of lower than the particular temperature, depressurizing is preferably conducted until a pressure reaches below 50 kgf/cm$^2$. In this manner, generation of cracks in the sintered body can be inhibited. This depressurizing is preferably conducted when the size of the sintered body is large since the large sintered body is prone to cracking. Such depressurizing is preferably performed when hot press sintering or SPS sintering is employed. As described above, the timing of depressurizing the pressing pressure is critical from the viewpoints of transparency and suppression of cracks. The timing of depressurizing that achieves both is particularly preferably when 1200° C. is reached during the temperature decrease.

The alumina sintered body obtained by the production method of the present invention has a high degree of orientation and a small tilt angle, is dense, and has a high purity and high transparency. Regarding the degree of orientation, an alumina sintered body in which the degree of c-plane orientation determined by the Lotgering method using an X-ray diffraction profile in the range of 2θ=20° to 70° obtained under X-ray irradiation is 5% or more (preferably 60% or more, more preferably 80% or more, yet more preferably 90% or more, and particularly preferably 96% or more) can be obtained. Regarding the tilt angle, an alumina sintered body in which the XRC·FWHM measured by using an X-ray rocking curve method is 15° or less (more preferably 10° or less, yet more preferably 6° or less, still more preferably 5° or less, further more preferably 4° or less, particularly preferably 3.2° or less, yet more preferably 2.6° or less, and still more preferably 1° or less) can be obtained. Regarding the denseness, an alumina sintered body having zero pores or 50 or less pores having a diameter of 0.1 μm or more visually observed from a photograph of any desired section, which is polished by ion-milling, taken in a viewing area of 712.99 μm in a vertical direction and 753.90 μm in a horizontal direction at a magnification factor of 2000 can be obtained. Regarding the purity, an alumina sintered body in which the total mass ratio of the impurity elements other than Mg and C is 100 ppm or less (preferably 50 ppm or less, more preferably 30 ppm or less, and yet more preferably 10 ppm or less) can be obtained. The mass ratio of Mg is preferably 3000 ppm or less, more preferably 1000 ppm or less, yet more preferably 500 ppm or less, and particularly preferably 350 ppm or less. The mass ratio of Mg is preferably 20 ppm or more. The mass ratio of C is preferably 100 ppm or less, more preferably 70 ppm or less, and yet more preferably 50 ppm or less. For the sake of convenience, the alumina content is assumed to be the value obtained by subtracting the total mass (%) of the impurity elements from 100, and an alumina sintered body having an alumina content of 99.8 mass % or more and preferably 99.9 mass % or more can be obtained. Regarding the optical translucency, an alumina sintered body in which a sample 0.5 mm in thickness taken therefrom has an in-line transmittance of 50% or more at a wavelength of 300 to 1000 nm can be obtained. The in-line transmittance can be measured with a spectrophotometer (for example, Lambda 900 produced by PerkinElmer Inc.). When the thickness of the sample is to be converted into a different thickness, the following conversion formula may be used. This formula is cited from Scripta Materialia vol. 69, pp 362-365 (2013). In the formula, T1 is an actual measured value of the in-line transmittance, T2 is an in-line transmittance after conversion, t1 is an actually measured value of the thickness, t2 is a thickness after conversion, and R is a surface reflectance inherent to the material (0.14 for alumina).

$$T2=(1-R)(T1/(1-R))^{(t2/t1)}$$

The transparent alumina sintered body obtained as such can be used in an optical device, a base substrate for optical device, a substrate for epitaxial growth, an electrostatic chuck, or the like. Examples of the optical device and the base substrate for optical device include an LED, an LD, a solar cell, a sensor, a photodiode, an optical member, and a window material.

EXAMPLES

Experimental Example 1

1. Preparation of Alumina Sintered Body
    (1) Preparation of Plate-Like Alumina Powder
    Ninety-six parts by mass of high-purity γ-alumina (TM-300D produced by TAIMEI CHEMICALS Co., Ltd.), 4 parts by mass of high-purity AlF$_3$ (special grade Shika produced by Kanto Chemical Co., Inc.), and 0.17 parts by mass of high-purity α-alumina (TM-DAR produced by TAIMEI CHEMICALS Co., Ltd., D50=1 μm) serving as seed crystals were mixed in a pot mill for 5 hours using φ 2 mm alumina balls with isopropyl alcohol (IPA) serving as a solvent. The total of the mass ratios of the impurity elements other than F, H, C, and S in the resulting mixed powder was 1000 ppm or less. Into a high-purity alumina sagger (volume: 750 cm$^3$) having a purity of 99.5% by mass, 300 g of the resulting mixed raw material powder was placed, a high-purity alumina lid having a purity of 99.5% by mass was placed, and a heat treatment was conducted in an electric furnace under air flow at 900° C. for 3 hours. The air flow rate was set to 25000 cc/min. The heat-treated powder was annealed in air at 1150° C. for 40 hours, and then the annealed powder was pulverized with φ 2 mm alumina balls for 4 hours to obtain a plate-like alumina powder having an average particle diameter of 2 μm, an average thickness of 0.2 μm, and an aspect ratio of 10. The average particle diameter and the average thickness of the particles were determined by observing arbitrarily selected one hundred particles in the plate-like alumina powder by using a scanning electron microscope (SEM). The average particle diameter is the average of the long axis lengths of the particles, the average thickness is the average of the short axis lengths of the particles, and the aspect ratio is average particle diameter/average thickness. The resulting plate-like alumina powder was α-alumina.

The impurity elements in the plate-like alumina powder obtained as described above were quantitatively analyzed by the following methods. Then the F content in the plate-like alumina powder×1 (mass ppm) was determined. The F content×1 is the value calculated by using the mass of F determined by alkali fusion-ion chromatography. The F content×1 of the plate-like alumina powder of Experimental Example 1 was 5600 ppm. Only F was detected as the impurity element other than Al, and all other analytical elements were equal to or lower than the detection limit. The purity of the plate-like alumina powder determined as (100−mass of F (%)) was 99.97%.

C and S: The C and S contents were analyzed by firing (high-frequency heating)-infrared absorption spectroscopy with a carbon/sulfur analyzer (CS844 produced by LECO JAPAN CORPORATION).

N: The N content was analyzed by an inert gas fusion-thermal conductivity method with an oxygen/nitrogen analyzer (EMGA-650W produced by HORIBA Ltd.).

H: The H content was analyzed by inert gas fusion-nondispersive infrared absorption spectroscopy with a hydrogen analyzer (EMGA-921 produced by HORIBA Ltd.).

F: The F content was determined by alkali fusion-ion chromatography. To 0.1 to 1 part by weight of the plate-like alumina powder in a platinum crucible, 1 to 3 parts by weight of anhydrous sodium carbonate was added, and the resulting mixture was thoroughly mixed to homogeneity, heated, and fused. After cooling, the crucible still containing the fusion product was put in a beaker containing warm water to warm the fusion product so as to completely dissolve soluble salts. The resulting aqueous solution was analyzed by ion chromatography (IC-5000 produced by Thermo Fisher Scientific Inc.).

Other impurity elements (mainly Si, Fe, Ti, Na, Ca, Mg, K, P, V, Cr, Mn, Co, Ni, Cu, Zn, Y, Zr, Pb, Bi, Li, Be, B, Cl, Sc, Ga, Ge, As, Se, Br, Rb, Sr, Nb, Mo, Ru, Rh, Pd, Ag, Cd, In, Sn, Sb, Te, Cs, Ba, Hf, Ta, W, Ir, Pt, Au, Hg, La, Ce, Pr, Nd, Sm, Eu, Gd, Tb, Dy, Ho, Er, Tm, Yb, and Lu): The plate-like alumina powder was dissolved by a pressure sulfuric acid decomposition method in accordance with JIS R 1649, and analysis was conducted with an inductively coupled plasma (ICP) emission spectrometer (PS3520UV-DD produced by Hitachi High-Tech Science Corporation).

(2) Tape Casting

A mixed alumina powder (T=0.1) was prepared by mixing 0.1 parts by mass of the plate-like alumina powder prepared in (1) above and 99.9 parts by mass of a fine alumina powder (TM-DAR, average particle diameter: 0.1 μm, produced by TAIMEI CHEMICALS Co., Ltd.). To 100 parts by mass of the mixed alumina powder, 0.25 parts by mass of magnesium oxide (500 A produced by Ube Material Industries, Ltd.), 7.8 parts by mass of polyvinyl butyral (product number BM-2 produced by SEKISUI CHEMICAL CO., LTD.) serving as a binder, 3.9 parts by mass of di(2-ethylhexyl)phthalate (produced by KUROGANE KASEI Co., Ltd.) serving as a plasticizer, 2 parts by mass of sorbitan trioleate (RHEODOL SP-030 produced by Kao Corporation) serving as a dispersing agent, and 2-ethylhexanol serving as a dispersing medium were added and mixed. The amount of the dispersing medium was adjusted so that the slurry viscosity was 20000 cP. The slurry prepared as such was casted into a sheet shape by a doctor blade method on a PET film so that the thickness after drying was 20 μm. The obtained tape was cut to obtain circular sheets having a diameter of 50.8 mm (2 inches), 150 of such sheets were stacked and placed on an Al plate having a thickness of 10 mm, the resulting stack was placed in a package, and the interior of the package was vacuumed so as to prepare a vacuum packaging. The vacuum packaging was subjected to isostatic pressing at a pressure of 100 kgf/cm$^2$ in 85° C. hot water so as to obtain a disk-like compact.

The mass ratio R1 (ppm) of F relative to Al in the mixed alumina powder was determined from equation (1) above. In Experimental Example 1, the mass ratio R1 of the mixed alumina powder was 10.6 ppm each. The impurity elements other than Mg, C, and F in the mixed alumina powder were equal to or lower than the detection limit.

(3) Sintering

The resulting compact was placed in a degreasing furnace and degreased under the condition of 600° C. for 10 hours. The resulting degreased body was sintered by using a graphite mold by hot pressing in nitrogen at a sintering temperature (highest attained temperature) of 1975° C. for 4 hours at a surface pressure of 200 kgf/cm$^2$ so as to obtain an alumina sintered body. As the temperature was decreased from the sintering temperature, the pressing pressure was maintained until 1200° C., and the pressing pressure was released to zero in a temperature range of lower than 1200° C.

2. Properties of Alumina Sintered Body (1) Degree of C-Plane Orientation

In order to examine the degree of orientation of the resulting alumina sintered body, the alumina sintered body was polished in a manner parallel to the top surface of the disk-like alumina sintered body, and then an X-ray was applied to the polished surface to measure the degree of c-plane orientation. An XRD profile was measured in the range of 2θ=20 to 70° by using an XRD system (RINT-TTR III produced by Rigaku Corporation). Specifically, measurement was conducted by using CuKa line at a voltage of 50 kV and a current of 300 mA. The degree of c-plane orientation was calculated by the Lotgering method. Specifically, the following equation was used for calculation. In the equations, P is a value obtained by XRD of the alumina sintered body, and $P_0$ is a value calculated from the standard α-alumina (JCPDS, card No. 46-1212). The degree of c-plane orientation of the alumina sintered body of Experimental Example 1 was 99.5%.

$$\text{Degree of } c\text{-plane orientation } [\%] = \frac{p - p_0}{1 - p_0} \times 100 \quad \text{[Math. 1]}$$

$$p_0 = \frac{I_0(006)}{\sum I_0(hkl)}$$

$$p = \frac{I_s(006)}{\sum I_s(hkl)}$$

(2) Tilt Angle

Figure 4:
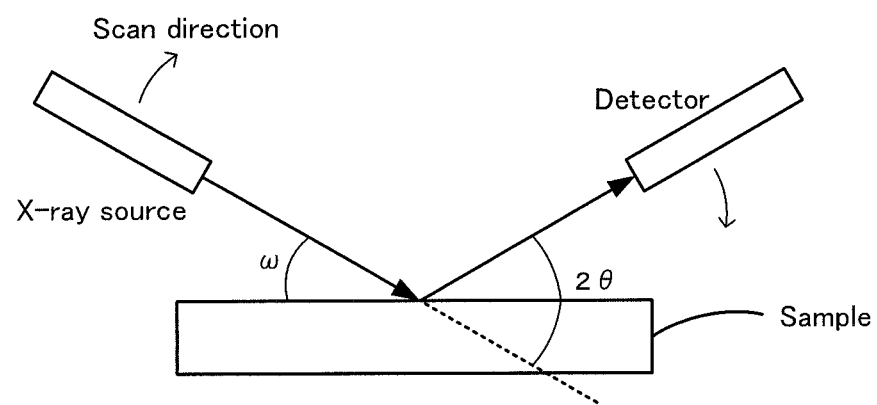
FIG. 4 is a diagram illustrating rocking curve measurement.

The tilt angle is the tilt distribution of the crystal axes and is a parameter for evaluating how frequent the crystal orientation of alumina is tilted from the c-axis. Here, the tilt angle is expressed by the half width (FWHM) of an X-ray rocking curve (XRC). The XRC·FWHM was measured by scanning the plate surface of the alumina sintered body (the same surface as those used in measuring the degree of c-plane orientation) by using an X-ray source and a detector moving in coordination as illustrated in FIG. 4, and measuring the half width of the obtained curve. Such a measurement method with which the value of 2θ (the angle formed between the detector and the incident X-ray) is fixed at the diffraction peak position and only ω (the angle formed between the sample substrate surface and the incident X-ray)

is scanned is called rocking curve measurement. The instrument used was RINT-TTR III produced by Rigaku Corporation, the CuKα line was used, and under the conditions of a voltage of 50 kV and a current of 300 mA, the scan range for ω was set to 3.8° to 38.8°. The XRC·FWHM of the alumina sintered body of Experimental Example 1 was 3.4°.

(3) Number of Pores (Density)

Figure 5:
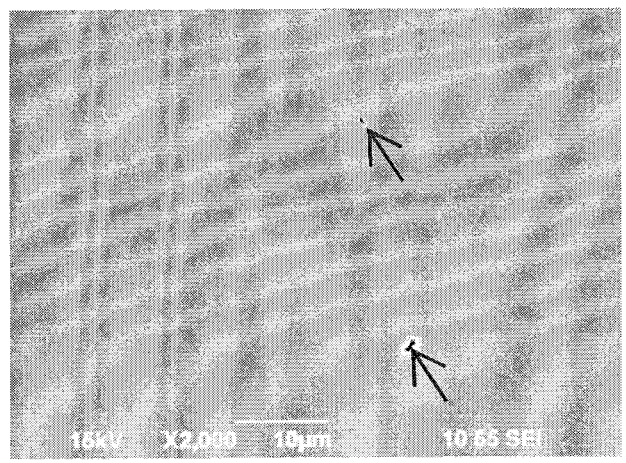
FIG. 5 is a high-magnification photograph of a polished section of an alumina sintered body.

After any desired section of the resulting alumina sintered body was preliminarily polished by using diamond abrasive grains, the section was polished with a cross-section polisher (CP) (IB-09010CP produced by JEOL Ltd.). CP belongs to the category of ion milling. CP was used because grains do not detach from the polished surface. The obtained section was photographed with a scanning electron microscope (JSM-6390 produced by JEOL Ltd.). Regarding the magnification factor for observation, specifically, photographs, each having a viewing area 47.53 µm in a vertical direction and 50.26 µm in a horizontal direction, were taken at a magnification factor of 2000 and arranged in order so that they formed a continuous image having a length equal to a total of fifteen photographs in the vertical direction and a width equal to a total of fifteen photographs in the horizontal direction (712.99 µm in the vertical direction and 753.90 µm in the horizontal direction), and the number of pores having a diameter of 0.1 µm or more was counted by visual observation. As shown by the photograph in FIG. 5, the pore and the portions that do not constitute pores can be easily visually distinguished since they have sharp contrast. The number of pores confirmed in the alumina sintered body of Experimental Example 1 was 4. The diameter of a pore was assumed to be the largest distance between two fixed points on the outer circumference of the pore.

(4) Impurity Content

For impurity elements other than F, the quantitative analysis was conducted by the methods described below after the alumina sintered body was pulverized in an alumina mortar having a purity of 99.9 mass %. For F, the quantitative analysis was conducted by the procedures described below after mirror-polishing the alumina sintered body. Then the total of the mass ratios (ppm) of the impurity elements other than Mg and C in the alumina sintered body was determined. The impurity elements other than Mg and C in the alumina sintered body of Experimental Example 1 were all equal to or lower than the detection limit, and 256 ppm of Mg and 40 ppm of C were detected.

C and S: The C and S contents were analyzed by firing (high-frequency heating)-infrared absorption spectroscopy with a carbon/sulfur analyzer (CS844 produced by LECO JAPAN CORPORATION).

N: The N content was analyzed by an inert gas fusion-thermal conductivity method with an oxygen/nitrogen analyzer (EMGA-650W produced by HORIBA Ltd.).

H: The H content was analyzed by inert gas fusion-nondispersive infrared absorption spectroscopy with a hydrogen analyzer (EMGA-921 produced by HORIBA Ltd.).

F: The F content was analyzed by dynamic secondary ion mass spectroscopy (D-SIMS) (IMS-6f produced by CAMECA). The measurement conditions were as follows:

Primary ion species: $Cs^+$
Primary ion acceleration energy: 14 to 15 keV
Secondary ion polarity: negative
Charge compensation: E-gun
Sputtering cycle: 100 to 500 cycles The average value between 200th to 300th sputtering cycles was used as the F content. In the quantitative analysis, a standard sample having the same composition (AlO) as that of the analysis sample and having a known concentration was measured under the same conditions as those for the analysis sample to obtain a relative sensitivity coefficient, and the quantity was determined therefrom. As a result, the F content in the sintered body was equal to or lower than the detection limit (0.1 mass ppm).

Other impurity elements (mainly Si, Fe, Ti, Na, Ca, Mg, K, P, V, Cr, Mn, Co, Ni, Cu, Zn, Y, Zr, Pb, Bi, Li, Be, B, Cl, Sc, Ga, Ge, As, Se, Br, Rb, Sr, Nb, Mo, Ru, Rh, Pd, Ag, Cd, In, Sn, Sb, Te, Cs, Ba, Hf, Ta, W, Ir, Pt, Au, Hg, La, Ce, Pr, Nd, Sm, Eu, Gd, Tb, Dy, Ho, Er, Tm, Yb, and Lu): The plate-like alumina powder was dissolved by a pressure sulfuric acid decomposition method in accordance with JISR 1649, and analysis was conducted with an inductively coupled plasma (ICP) emission spectrometer (PS3520UV-DD produced by Hitachi High-Tech Science Corporation).

(5) In-Line Transmittance

The resulting alumina sintered body was cut to a size of 10 mm×10 mm, and four such cut pieces were fixed onto the outermost peripheral portion of a ϕ 68 mm metal surface plate every 90°, and lap-polished (preliminary polishing) on a SiC abrasive paper for 10 minutes with #800 and 5 minutes with #1200 while applying a load from the metal surface plate and the polishing jig only (a total of 1314 g). Subsequently, lap-polishing was performed on a ceramic surface plate with diamond abrasive grains. The lap-polishing was performed for 30 minutes with an abrasive grain size of 1 µm and then for 2 hours with an abrasive grain size of 0.5 µm. The 10 mm×10 mm×0.5 mm (thickness) sample after polishing was sequentially washed with acetone, ethanol, and ion exchange water in this order for 3 minutes each, and then the in-line transmittance at a wavelength of 300 to 1000 nm was measured by using a spectrophotometer (Lambda 900 produced by PerkinElmer Inc.). The in-line transmittance at a wavelength of 300 to 1000 nm of the alumina sintered body of Experimental Example 1 was 80.5% or more.

The production conditions and properties of the alumina sintered body of Experimental Example 1 described above are summarized in Table 1. Note that in the column of the in-line transmittance in Table 1, the minimum value of the in-line transmittance at a wavelength of 300 to 1000 nm is indicated.

TABLE 1

| | | | | | | | | | |
|---|---|---|---|---|---|---|---|---|---|
| | Production conditions of the alumina sintered body*1 | | | | | | | | |
| | | Additive | | | Amount of each impurity element | | | Sintering | Retaining | Depressurizing |
| Experimental Example | T | Kind | Z (mass ppm) | R1 | other than Mg, C, F (mass ppm) | Sintering method | temperature (° C.) | time (h) | temperature (° C.) |
| 1 | 0.1 | MgO | 500 | 10.6 | Equal to or lower than the detection limit | Hot pressing | 1975 | 4 | 1200 |
| 2 | 0.1 | MgO | 500 | 10.6 | Equal to or lower than the detection limit | Hot pressing | 1900 | 4 | 1200 |

TABLE 1-continued

| | | | | | | | | | |
|---|---|---|---|---|---|---|---|---|---|
| 3 | 0.1 | MgO | 500 | 10.6 | Equal to or lower than the detection limit | Hot pressing | 1850 | 4 | 1200 |
| 4 | 0.9 | MgO | 125 | 0*2 | P: 26 Na: 13 | Hot pressing | 1975 | 4 | 1200 |
| 5 | 0.9 | MgO | 125 | 0*2 | P: 26 Na 13 | Hot pressing | 1900 | 4 | 1200 |
| 6 | 0.9 | MgO | 125 | 0*2 | P: 26 Na: 13 | Hot pressing | 1850 | 4 | 1200 |
| 7 | 0.7 | MgO | 125 | 0*2 | P: 20 Na: 10 | Hot pressing | 1975 | 4 | 1200 |
| 8 | 0.35 | MgO | 125 | 0*2 | Equal to or lower than the detection limit | Hot pressing | 1975 | 4 | 1200 |
| 9 | 0.1 | MgO | 125 | 0*2 | Equal to or lower than the detection limit | Hot pressing | 1975 | 4 | 1200 |
| 10 | 0.05 | MgO | 125 | 0*2 | Equal to or lower than the detection limit | Hot pressing | 1975 | 4 | 1200 |
| 11 | 0.05 | MgO | 125 | 0*2 | Equal to or lower than the detection limit | HIP | 1975 | 2 | 1200 |
| 12 | 0.03 | MgO | 125 | 0*2 | Equal to or lower than the detection limit | Hot pressing | 1975 | 4 | 1200 |
| 13 | 0.01 | MgO | 125 | 0*2 | Equal to or lower than the detection limit | Hot pressing | 1975 | 4 | 1200 |
| 14 | 0.001 | MgO | 125 | 0*2 | Equal to or lower than the detection limit | Hot pressing | 1975 | 4 | 1200 |
| 15 | 0.0005 | MgO | 500 | 0.053 | Equal to or lower than the detection limit | Hot pressing | 1975 | 4 | 1200 |
| 16 | 0.0005 | MgO | 125 | 0*2 | Equal to or lower than the detection limit | Hot pressing | 1975 | 4 | 1200 |
| 17 | 2 | MgO | 125 | 0*2 | P: 58 Na: 29 | Hot pressing | 1800 | 4 | 1200 |
| 18 | 1 | MgO | 125 | 0 | P: 29 Na: 14 | Hot pressing | 1850 | 4 | 1200 |

| | Properties of the alumina sintered body | | | | | | |
|---|---|---|---|---|---|---|---|
| Experimental Example | Degree of c-plane orientation (%) | XRC · FWHM (°) | Amount of impurity (mass ppm) | Number of pores | Mg content (mass ppm) | C content (mass ppm) | In-line transmittance (%) |
| 1 | 99.5 | 3.4 | Equal to or lower than the detection limit | 4 | 256 | 40 | 80.5 |
| 2 | 98.2 | 4.6 | Equal to or lower than the detection limit | 21 | 255 | 40 | 71.2 |
| 3 | 81.7 | 5.3 | Equal to or lower than the detection limit | 44 | 256 | 40 | 60.4 |
| 4 | 100.0 | 3.2 | P: 14 | 33 | 64 | 40 | 60.4 |
| 5 | 99.8 | 3.5 | P: 21 | 42 | 65 | 40 | 57.9 |
| 6 | 99.1 | 4.2 | P: 24 Na: 10 | 69 | 65 | 40 | 54.1 |
| 7 | 100.0 | 2.7 | P: 11 | 28 | 64 | 40 | 64.6 |
| 8 | 100.0 | 2.4 | Equal to or lower than the detection limit | 20 | 65 | 40 | 72.8 |
| 9 | 100.0 | 2.6 | Equal to or lower than the detection limit | 13 | 63 | 40 | 77.2 |
| 10 | 99.7 | 2.6 | Equal to or lower than the detection limit | 9 | 62 | 40 | 77.9 |
| 11 | 99.6 | 2.5 | Equal to or lower than the detection limit | 5 | 63 | 20 | 79.1 |
| 12 | 96.2 | 2.6 | Equal to or lower than the detection limit | 6 | 64 | 40 | 78.6 |
| 13 | 61.4 | 2.8 | Equal to or lower than the detection limit | 4 | 65 | 40 | 71.2 |
| 14 | 12.6 | 2.9 | Equal to or lower than the detection limit | 3 | 66 | 40 | 58.4 |
| 15 | 1.4 | 6.2 | Equal to or lower than the detection limit | 2 | 256 | 40 | 48.0 |
| 16 | 1.2 | 4.3 | Equal to or lower than the detection limit | 2 | 67 | 40 | 44.2 |
| 17 | 100.0 | 5.1 | P: 46 Na: 19 | 112 | 65 | 40 | 27.2 |
| 18 | 100.0 | 5.3 | P: 27 Na: 11 | 102 | 65 | 40 | 49.8 |

*1: The sintering atmosphere is a nitrogen atmosphere.
*2 Since F was equal to or lower than the detection limit, RI was assumed to be zero.

Experimental Examples 2 and 3

In Experimental Examples 2 and 3, alumina sintered bodies were prepared as in Experimental Example 1 except that the sintering temperature (highest attained temperature) was changed to 1900° C. and 1850° C., respectively. The properties of 2.(1) to (5) mentioned above of these alumina sintered bodies were determined. The results are indicated in Table 1.

Experimental Example 4

An alumina sintered body was prepared as in Experimental Example 1 except that a commercially available plate-like alumina powder (Grade 10030 produced by KINSEI MATEC CO., LTD., average particle diameter: 10 μm, average thickness: 0.3 μm, aspect ratio: 33) was used as the plate-like alumina raw material, and that the plate-like alumina powder and the fine alumina powder (TM-DAR, average particle diameter: 0.1 μm, produced by TAIMEI CHEMICALS Co., Ltd.) were mixed at ratios of 0.9 parts by mass and 99.1 parts by mass, respectively. Since F contained in the plate-like alumina powder and the mixed alumina powder was equal to or lower than the detection limit (500 mass ppm), the mass ratio R1 was assumed to be zero. As the impurity elements other than Mg, C, and F in the mixed alumina powder, 26 mass ppm of P and 13 mass ppm of Na were detected. The properties of 2.(1) to (5) mentioned above of the resulting alumina sintered body were determined. The results are indicated in Table 1.

Experimental Examples 5 to 14

In Experimental Examples 5 to 14, alumina sintered bodies were prepared under the alumina sintered body production conditions indicated in Table 1 by using the same commercially available plate-like alumina powder and fine alumina powder as those used in Experimental Example 4. However, In Experimental Example 11, an alumina sintered body was obtained by HIP sintering under the conditions of a sintering temperature of 1975° C. for 2 hours and a surface pressure of 1886 kgf/cm². In HIP sintering, after 1975° C. was retained, the temperature was decreased while a pressure as high as a surface pressure of 1000 kgf/cm² or higher was retained until 1200° C. The properties of 2.(1) to (5) mentioned above of these alumina sintered bodies were determined. The results are indicated in Table 1.

Experimental Example 15

In Experimental Example 15, an alumina sintered body was prepared as in Experimental Example 1 except that the value of T was 0.0005. The properties of 2.(1) to (5) mentioned above of the resulting alumina sintered body were determined. The results are indicated in Table 1.

Experimental Examples 16 to 18

In Experimental Examples 16 to 18, alumina sintered bodies were prepared under the alumina sintered body production conditions indicated in Table 1 by using the same commercially available plate-like alumina powder and fine alumina powder as those used in Experimental Example 4. The properties of 2.(1) to (5) mentioned above of the resulting alumina sintered bodies were determined. The results are indicated in Table 1.

[Evaluation]

In Experimental Examples 1 to 14, an alumina raw material powder containing a plate-like alumina powder and a fine alumina powder was prepared so that the mixing ratio of the plate-like alumina powder to the fine alumina powder in terms of mass ratio was T:(100−T) (T=0.001 to 0.9) and the mass ratio R1 was less than 15 ppm, and a raw material for forming containing this alumina raw material powder was formed and then sintered. The alumina sintered bodies obtained in Experimental Examples 1 to 14 had a high degree of orientation, was dense, and had a high purity and a high in-line transmittance (in other words, high transparency). In addition, according to this production method, there is no need to utilize a high magnetic field as in the related art, and a device for treating fluorine compounds is not necessary; thus, the production cost for the transparent alumina sintered body can be suppressed low. Furthermore, since the transparent alumina sintered body can be easily produced, the method is suitable for mass production.

In contrast, in Experimental Examples 15 and 16, because T was as small as 0.0005, the degree of c-plane orientation was excessively small or the tilt angle (XRC·FWHM) was excessively large, and thus only alumina sintered bodies with low in-line transmittances could be obtained. In Experimental Example 17, because T was as large as 2, the number of pores was excessively large, and thus only an alumina sintered body with a low in-line transmittance could be obtained. In Experimental Example 18, because T was as large as 1, the number of pores was excessively large, and thus only an alumina sintered body with a low in-line transmittance could be obtained.

Note that Experimental Examples 1 to 14 correspond to the examples of the present invention, and Experimental Examples 15 to 18 correspond to the comparative examples. Naturally, the present invention is not limited by the above-described experimental examples and various other modifications can be implemented without departing from the technical scope of the present invention.

The present application claims priority from Japanese Patent Application No. 2015-193944, filed on Sep. 30, 2015, the entire contents of which are incorporated herein by reference.

What is claimed is:

1. A method for producing a transparent alumina sintered body, the method comprising:
(a) a step of preparing an alumina raw material powder containing a plate-like alumina powder having an aspect ratio of 3 or more and a fine alumina powder having an average particle diameter smaller than that of the plate-like alumina powder so that, at a mixing ratio T:(100−T) of the plate-like alumina powder to the fine alumina powder in terms of mass ratio, T is 0.001 or more and less than 1, and a mass ratio R1 of F relative to Al in the alumina raw material powder is less than 15 ppm;
(b) a step of forming a raw material for forming containing the alumina raw material powder into a compact; and
(c) a step of sintering the compact so as to obtain a transparent alumina sintered body,
where the mass ratio R1 is a value calculated from formula (1) below:

$$R1=100\times[x1\times T+x2\times(100-T)+x3\times Z]/[y1\times T+y2\times(100-T)+y3\times z] \quad (1)$$

where the unit is mass ppm; Z is a ratio of an additive externally added to the alumina raw material powder relative to the alumina raw material powder (mass %);

x1 is an F content (mass ppm) in the plate-like alumina powder, x2 is an F content (mass ppm) in the fine alumina powder, and x3 is an F content (mass ppm) in the additive; the F contents are determined by alkali fusion-ion chromatography; y1 is an Al content (mass %) in the plate-like alumina powder, and y2 is an Al content (mass %) in the fine alumina powder; the Al contents are values (mass %) each obtained by determining an alumina purity of each alumina powder as 100−(sum in terms of mass % of impurity elements other than Al and O), and multiplying the obtained result by 0.529; the mass % of the impurity elements is determined as follows: that is, high-frequency heating-infrared absorption spectroscopy is used to determine an S content, an inert gas fusion-thermal conductivity method is used to determine an N content, inert gas fusion-nondispersive infrared absorption spectroscopy is used to determine an H content, alkali fusion-ion chromatography is used to determine an F content, and inductively coupled plasma (ICP) emission spectroscopy is used to determine contents of other elements; and y3 is an Al content (mass %) in the additive and is determined by inductively coupled plasma (ICP) emission spectrometry.

2. The method for producing a transparent alumina sintered body according to claim 1,
wherein, in step (b), a mixture prepared by adding 0.005 to 0.5 parts by mass of MgO to 100 parts by mass of the alumina raw material powder is used as the raw material for forming.

3. The method for producing a transparent alumina sintered body according to claim 1,
wherein, in step (c), sintering is performed so that contents of impurity elements other than Mg and C contained in the transparent alumina sintered body are each 10 mass ppm or less.

4. The method for producing a transparent alumina sintered body according to claim 1, wherein, in step (c), the compact is sintered at 1850° C. or higher.

5. The method for producing a transparent alumina sintered body according to claim 1, wherein, in step (c), the compact is subjected to pressure-sintering.

6. The method for producing a transparent alumina sintered body according to claim 5, wherein, in step (c) while decreasing a temperature from a highest attained temperature during sintering, continuously applying a pressure of 50 kgf/cm$^2$ or more until a particular temperature set within a range of 1000 to 1400° C. is reached, and decreasing the pressure to less than 50 kgf/cm$^2$ at a temperature equal to or lower than the particular temperature.

\* \* \* \* \*

UNITED STATES PATENT AND TRADEMARK OFFICE
CERTIFICATE OF CORRECTION

Page 1 of 1

PATENT NO. : 10,717,677 B2
APPLICATION NO. : 15/903146
DATED : July 21, 2020
INVENTOR(S) : Morimichi Watanabe et al.

It is certified that error appears in the above-identified patent and that said Letters Patent is hereby corrected as shown below:

On the Title Page

<u>Assignee, Item (73)</u>
Please change: "Assignee: NGK Insultators, Ltd., Nagoya (JP)" to -- Assignee: NGK Insulators, Ltd., Nagoya (JP) --

Signed and Sealed this
Twenty-fifth Day of August, 2020

Andrei Iancu
*Director of the United States Patent and Trademark Office*